Figure 1:
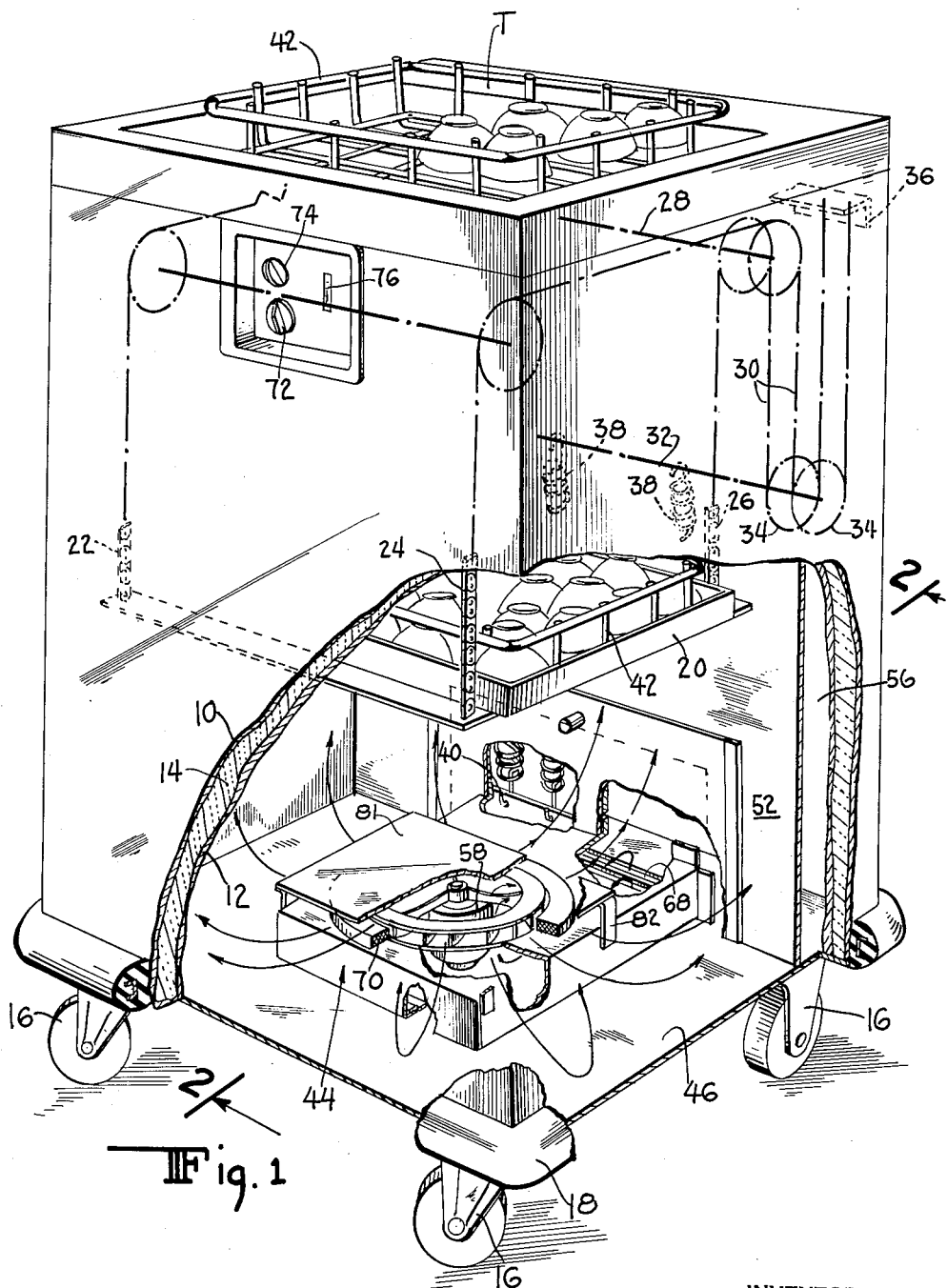

May 8, 1962  R. L. HOLLOWAY ETAL  3,033,633
SELF-LEVELING DISPENSER

Filed Jan. 28, 1960  2 Sheets-Sheet 1

INVENTORS
ROBERT L. HOLLOWAY
EDWARD R. McCARTEN
BY
ATTORNEY

May 8, 1962 R. L. HOLLOWAY ETAL 3,033,633
SELF-LEVELING DISPENSER
Filed Jan. 28, 1960 2 Sheets-Sheet 2
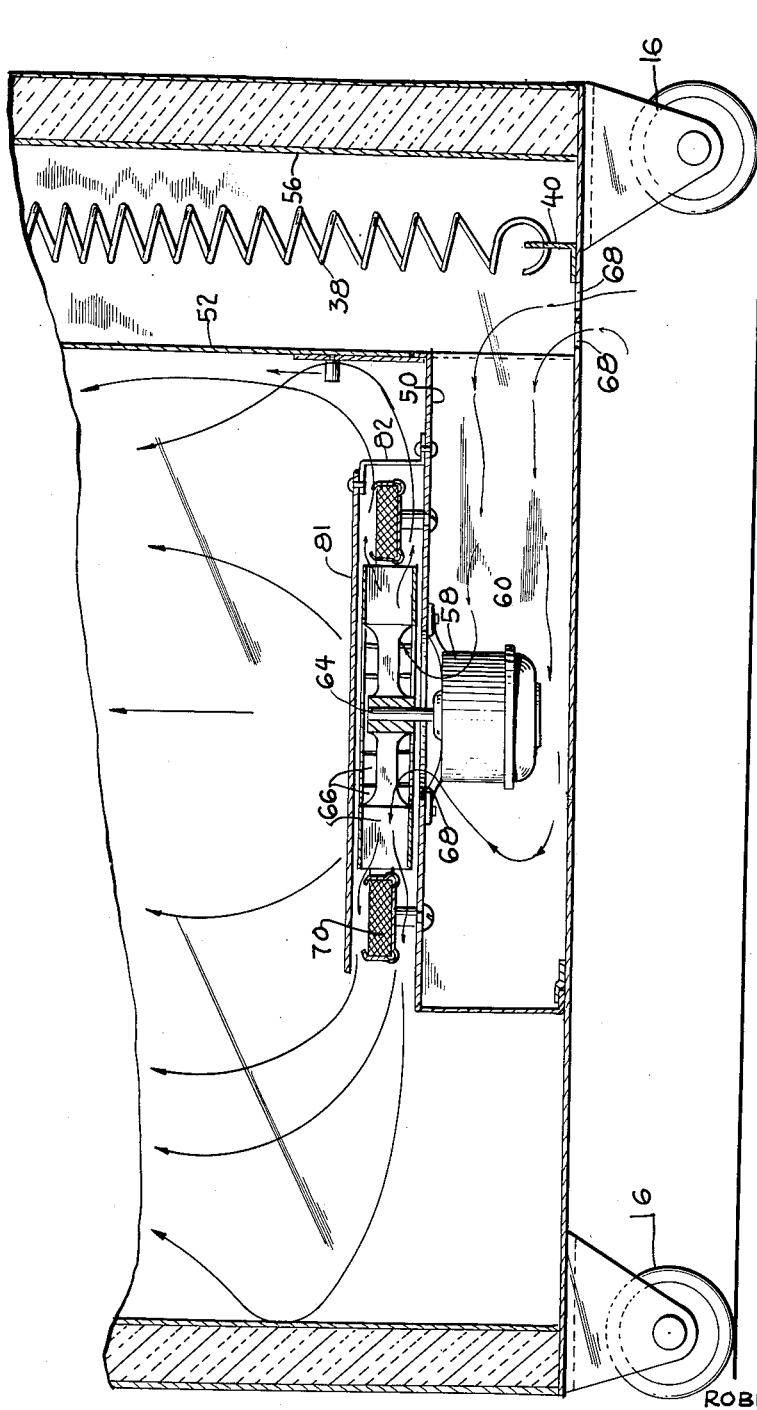
INVENTORS
ROBERT L HOLLOWAY
EDWARD R. McCARTEN
BY
ATTORNEY

United States Patent Office 3,033,633
Patented May 8, 1962

3,033,633
SELF-LEVELING DISPENSER
Robert L. Holloway, Snyder, and Edward R. McCarten, Port Chester, N.Y., assignors to American Machine & Foundry Company, a corporation of New Jersey
Filed Jan. 28, 1960, Ser. No. 5,207
4 Claims. (Cl. 312—214)

This invention relates to a self-leveling, storing and dispensing apparatus.

When self-leveling dispensers are used for storing and dispensing cups, bowls, glasses and other forms of chinaware, it is frequently desired that these articles be preheated before they are used so that they will not chill the food put into them.

Various methods have been employed for heating the chinaware inside a cabinet in this way. One way of doing this was by means of electrical heating elements arranged in the cabinet in appropriate locations, so as to heat the chinaware in the cabinet by radiation. This was found to be unsatisfactory because some of the chinaware closest to the heating element would be come unduly warm and the cabinet itself also tended to pick up a considerable amount of heat directly from the heating element.

Another method employed for heating the cabinet was using a heating element in combination with a blower mounted in one of the side walls of the cabinet as shown in U.S. Patent 2,251,874, granted to W. J. Gibbs on August 5, 1941. This likewise, was found to be objectionable because more heat would get to some of the chinaware than other locations and this uneven heating way, of course, objectionable.

It is the purpose of the present invention, to achieve a uniform horizontal heating of all the chinaware in a tier in a self-leveling, storing and dispensing apparatus.

Another object of this invention is to provide heating means for a self-leveling, storing and dispensing cabinet wherein the amount of electrical current consumed is less than that which was formerly required.

Another object of this invention is to provide a self-contained, removable heating component, which can be readily placed in and removed from a self-leveling cabinet and which will effect a uniform heating of the material in the cabinet.

A further object of this invention is to provide a centrifugal fan heater under the stacked chinaware which will distribute heat uniformly across the cabinet and maintain a higher temperature at the upper level than lower levels so as to heat the dispensed chinaware in their order of usage.

Another object of this invention is to provide a heating device in a self-leveling dispenser wherein a circular heating element is positioned around the centrifugal air discharge area of the heating device.

A further object of this invention is to draw in air from the outside atmosphere in a self-leveling dispenser and pass it first over the motor to keep it cool and then conduct it to a rotating fan blade which will laterally disperse the air past a heating element interposed in the path of said air so as to effect a heating of the air before it is discharged from the heater radially into all areas at the bottom of the heated cabinet.

Another object is to preheat air by using it to cool an electric fan motor and then passing the preheated air over heating elements to discharge the same radially into an insulated cabinet of a self-leveling dispenser.

Other objects and features of the invention will appear as the description of the particular physical embodiment selected to illustrate the invention progresses. In the accompanying drawings which form a part of this specification, like characters of reference have been applied to corresponding parts throughout the several views which make up the drawings.

FIGURE 2 is a cross-sectional side elevation taken on the line 2—2 of FIGURE 1.

Referring to FIGURES 1 and 2, my self-leveling, storing and dispensing apparatus consists of an outside shell 10 and an inner shell 12, separated by a layer of insulation 14. A suitable framework, not shown, may be employed to which the outer and inner shells can be secured.

In order to make the self-leveling, storing apparatus portable, conventional castors 16 may be mounted and secured to the underside of the apparatus as shown in FIGURE 1. Similarly, a suitable bumper 18, made of a soft materail such as rubber, can be secured to the perimeter at the bottom of the cabinet. Apparatus of this general type is disclosed and described in U.S. Patent 2,251,874 mentioned above.

The material storing platform 20 may be supported in each corner by suitable chains 22, 24, and 26 as shown in FIGURE 1 and in U.S. Patent 2,251,874. The chains 22 and 24 at the far side of the carrier, and a pair of chains 26 (one of which is not shown), all pass over suitable sprockets keyed to a freely rotatable shaft 28. After the chains pass over the sprockets on shaft 28 in the manner shown in FIGURE 1, they form a loop 30 which carries a saddle shaft 32 carrying suitable sprockets 34. The sprockets are supported in the loops 30.

The opposite ends of the sprocket chains are anchored in a suitable manner to the upper end of the cabinet, i.e., to the bar 36. Suitable calibrated counter balancing springs 38 are hooked at one end to the saddle shaft 32 and are attached at their lower end to a suitable bracket 40 in a manner similar to that disclosed in U.S. Patent 2,251,874. The crockery or chinaware that is supported on the carrier 20 is placed in removable racks 42 which are stacked on top of one another on the carrier 20 so that there are air spaces between the chinaware permitting air to circulate upwardly from the bottom through the glassware supported in the racks 42, and also sidewise.

The springs 36 and 38 are of a calibrated tension so that they will always exert on the saddle shaft 32 sufficient tension so as to counterbalance the weight of material supported on the carrier 20, thereby maintaining the glassware at a constant predetermined level with respect to the top T of the cabinet, regardless of whether glassware is added or removed from that stacked on the carrier 20. For a more complete discussion of the self-leveling counterbalancing technique, reference may be made to U.S. Patent 2,851,874 referred to above.

My heating component, designated generally as 44, is supported on the floor 46 of the dispensing apparatus. The heating component is removably supported on the floor 46 and has a shell enclosure 48 having an inlet duct 50 extending under the sidewall 52, which encloses the counterbalancing springs 36 and 38. The duct 50 connects with an open area 56 which is formed by the sidewall 52 and the bottom frame of the self-leveling, storing and dispensing apparatus.

Air drawn through the open area 56 passes around and by the motor 58 which is supported by brackets 60 and 62 to the inlet duct 50. The upper end of the motor has a shaft 64 on which is mounted a bladed impeller 66. As the shaft 64 rotates, the impeller blades 66 cause air to be drawn from the duct 50 through openings 68. From there the air is discharged out past the impellers 66 which causes the air to flow past the electrical heating elements 70 which consists of a heating ring as shown in FIGURE 1 surrounding the path of rotation of the impellers 66. The air passing by the motor 58 and the impellers 66 is heated and is discharged outwardly in the manner shown by the arrows in FIGURES 1 and 2. The top plate 81 is positioned over the rotating blade 66 and heater 70 and acts as a radiant heat plate. It also serves as a safety device to prevent damage to the rotating element or physical contact with the heater. The top plate 81 is fastened to the duct 50 by legs 82.

It will be noted that the air is uniformly distributed towards all sides of the cabinet and there is no unevenness or concentration of heat in any one particular corner of the cabinet. As the heat rises upwardly through the chinaware supported on the carrier 20, all of the chinaware is uniformly heated. Because of the convection flow of air, there will be a slight tendency for the chinaware at the top of the stack to be somewhat warmer than that on the lowermost tier. It will thus be seen that I have provided a heated self-leveling, storing and dispensing cabinet wherein the heating component may be readily removed from the lower portion of the cabinet and wherein the lateral distribution of heat throughout the cabinet is uniform so that all the chinaware that is being dispensed has a uniform heat content.

Because of this particular arrangement, an economy in the amount of current required to heat the cabinet has likewise, been achieved. If desired, a suitable thermostat switch 72 and an on and off switch 74 may be provided in the apparatus. Similarly, a temperature gauge 76 can be mounted in the apparatus to indicate the inside temperature.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. A self-leveling, storing and dispensing apparatus comprising an insulated cabinet, a carrier mounted for movement up and down in said cabinet, said cabinet having an opening at the top for removing material stored on the carrier, a heat distributing member centrally disposed at the bottom of said cabinet, an air inlet duct connecting said fan with the outside atmosphere at the base of said cabinet, means for detachably connecting said heat distributing member to the bottom of said cabinet, a centrifugal fan for radially discharging heated air from said heat distributing member towards all walls of the cabinet so that the turbulent flow induced to the heated air by the fan combined with the natural convection flow induced by the exposure of said opening to the atmosphere causes the heated air to rise between the spaces in the material stored on the carrier and to be discharged through said opening on top of the cabinet.

2. A self-leveling, storing and dispensing apparatus comprising a cabinet having an opening at the top, a carrier mounted for up and down movement in said cabinet, counterbalancing mechanism mounted on one side of said cabinet for maintaining the top of the material stacked on said carrier at a constant level, a wall separating said mechanism from said cabinet, a heat distributing device positioned centrally at the bottom of said cabinet, an air inlet duct connecting said heat distributing device with the outside atmosphere, a centrifugal fan, means for detachably connecting said heat distributing device and said centrifugal fan from said cabinet as a single unit, said fan radially discharging heated air from said heat distributing member towards all walls of the cabinet so that the turbulent flow induced to the heated air by the fan combined with the natural convection flow induced by the opening on top of the cabinet causes the heated air to rise between the spaces in the material stored on the carrier to be discharged through said opening on top of the cabinet 3. A self-leveling, storing and dispensing apparatus comprising a cabinet, a carrier mounted for up and down movement in said cabinet, counterbalancing mechanism mounted on one side of said cabinet for maintaining the top of the material stacked on said carrier at a constant level, a wall separating said mechanism from said cabinet and connecting with an outlet in the bottom of said cabinet below said counterbalancing mechanism, a detachable heat distributing device positioned centrally at the bottom of said cabinet, a duct connecting said heat distributing device to said wall to draw in air from the outside atmosphere through the outlet in the bottom of said cabinet, a centrifugal fan for radially discharging heated air from said heat distributing member towards all walls of the cabinet so as to effect a uniform diffusion of heated air upwardly through the material supported on said carrier.

4. A self-leveling, storing and dispensing apparatus comprising a cabinet, a carrier mounted for up and down movement in said cabinet, counterbalancing mechanism mounted on one side of said cabinet for maintaining the top of the material stacked on said carrier at a constant level, a wall separating said mechanism from said cabinet and having an opening formed at the bottom end of said wall, a detachable heat distributing device positioned centrally at the bottom of said cabinet and having an inlet duct adapted to extend inside of said opening, a means on the underside of said heat distributing device for limiting the distance the said inlet duct can be extended inside of said wall opening and having means for preventing said heat distributing device from being lifted upwardly when in engagement with said means for limiting the distance, a panel slidably secured to said wall and having means for engaging with the inlet duct to prevent the duct from becoming disengaged with said opening when the panel is in place, an opening formed below said counterbalancing mechanism to permit air to be drawn into said duct through said opening from the outside atmosphere, and a fan for discharging heated air from said heat distributing member towards all walls of the cabinet so as to effect a uniform diffusion of heated air upwardly through the material supported on said carrier.

References Cited in the file of this patent

UNITED STATES PATENTS

| | | |
|---|---|---|
| 1,854,104 | Burkhart | Apr. 12, 1932 |
| 2,251,874 | Gibbs | Aug. 5, 1941 |
| 2,408,331 | Mills | Sept. 24, 1946 |
| 2,536,581 | Stephenson | Jan. 2, 1951 |
| 2,561,517 | Ladge | July 24, 1951 |
| 2,813,768 | Renn | Nov. 19, 1957 |

FOREIGN PATENTS

| | | |
|---|---|---|
| 687,466 | Great Britain | Feb. 11, 1953 |